United States Patent
Verret et al.

(10) Patent No.: US 9,773,298 B2
(45) Date of Patent: Sep. 26, 2017

(54) OSCILLATORY MOTION COMPENSATION IN FREQUENCY DOMAIN IN IMAGE MOTION SENSING SYSTEMS

(71) Applicant: Raytheon Company, Waltham, MA (US)

(72) Inventors: Jody D. Verret, Rockwall, TX (US); Corey Collard, Plano, TX (US); Erich Hefner, Rockwall, TX (US)

(73) Assignee: RAYTHEON COMPANY, Waltham, MA (US)

( * ) Notice: Subject to any disclaimer, the term of this patent is extended or adjusted under 35 U.S.C. 154(b) by 419 days.

(21) Appl. No.: 14/511,111

(22) Filed: Oct. 9, 2014

(65) Prior Publication Data

US 2015/0103169 A1    Apr. 16, 2015

Related U.S. Application Data

(60) Provisional application No. 61/890,016, filed on Oct. 11, 2013.

(51) Int. Cl.
*H04N 5/232* (2006.01)
*G06T 5/00* (2006.01)
(Continued)

(52) U.S. Cl.
CPC ............... *G06T 5/003* (2013.01); *G06T 5/10* (2013.01); *G06T 7/262* (2017.01);
(Continued)

(58) Field of Classification Search
CPC .. G06T 5/003; G06T 5/10; G06T 2207/20201; G06T 2207/30184;
(Continued)

(56) References Cited

U.S. PATENT DOCUMENTS

2008/0297747 A1* 12/2008 Bleeker ............... G03F 7/70283
355/52
2010/0135591 A1* 6/2010 Zador ................... G06T 1/0007
382/255

(Continued)

OTHER PUBLICATIONS

Updike, et al., Radiometric Use of WorldView-2 Imagery, Nov. 1, 2010, DigitalGlobe, Inc., 17 pages.

*Primary Examiner* — Zhihan Zhou
(74) *Attorney, Agent, or Firm* — Lewis Roca Rothgerber Christie LLP (57) ABSTRACT

A system and a method for processing multi-linear image data by measuring a relative oscillatory motion from a first-imaged array of the multi-linear optical array to a second-imaged array of the multi-linear optical array as a first function in time domain via image correlation; transforming the first function from the time domain to a second function in frequency domain; converting real and the imaginary parts of the second function to polar coordinates to generate a magnitude and a phase; correcting the polar coordinates from the second function in the frequency domain to generate a third function; converting the third function to rectangular coordinates to generate a fourth function in the frequency domain; and transforming the fourth function from the frequency domain to a fifth function in the time domain.

20 Claims, 10 Drawing Sheets

(51) Int. Cl.
*G06T 5/10* (2006.01)
*G06T 7/262* (2017.01)
(52) U.S. Cl.
CPC ............... *G06T 2207/10032* (2013.01); *G06T 2207/20056* (2013.01); *G06T 2207/20201* (2013.01); *G06T 2207/30184* (2013.01)
(58) Field of Classification Search
CPC . G06T 2207/10032; G06T 2207/20056; G06T 7/206
USPC ........................................................ 348/147
See application file for complete search history.

(56) References Cited

U.S. PATENT DOCUMENTS

| | | | |
|---|---|---|---|
| 2010/0279617 A1* | 11/2010 | Osman ................. | H04B 17/104 455/63.1 |
| 2013/0336551 A1* | 12/2013 | Clingman ............ | A61B 5/0095 382/128 |
| 2015/0058388 A1* | 2/2015 | Smigelski ............. | G06F 17/141 708/208 |

* cited by examiner

Simulated oscillatory motion, $g(t)$

FIG. 5

Simulated Chip-End-Correlation function $f(t)$

FIG. 6

Recovered oscillatory motion function $\hat{g}(t)$

FIG. 7

Simulated oscillatory motion $g(t)$ and recovered oscillatory motion $\hat{g}(t)$

Recovered OM, Second Iteration

*FIG. 10*

OSCILLATORY MOTION COMPENSATION IN FREQUENCY DOMAIN IN IMAGE MOTION SENSING SYSTEMS

CROSS-REFERENCE TO RELATED APPLICATION(S)

The present application claims priority to U.S. Provisional Patent Application No. 61/890,016, filed on Oct. 11, 2013, the contents of which are incorporated herein by reference in its entirety.

FIELD

The present application relates to correcting for oscillatory motion in images. More particularly, it relates to oscillatory motion compensation in frequency domain in image motion sensing systems.

BACKGROUND

Platforms such as aircraft and satellites can be used for capturing images of the earth. For example, as an aircraft flies over a region or as the satellite orbits the earth, an imaging device can be mounted on the platform to capture images of the earth. Some imaging devices can have multiple line-scanning imagers such as a bilinear optical array which capture multiple images simultaneously, and utilizes a computer or a processor to reconstruct the multiple images to form one complete image. Due to minute vibrations from the imaging device, when the multiple images are reconstructed, the reconstructed image may include some distortions like shear, or straight lines in the image can appear wavy. Therefore, methods to reduce or prevent these distortions can improve the quality of the images captured by the platform.

SUMMARY

According to an aspect of the embodiments, a method for processing multi-linear image data provided from a multi-linear optical array on an image collecting platform to correct for absolute oscillatory motion exhibited by the image collecting platform. The method may include: measuring a relative oscillatory motion from a first-imaged array of the multi-linear optical array to a second-imaged array of the multi-linear optical array as a first function in time domain via image correlation; transforming the first function from the time domain to a second function in frequency domain, the second function having a real part and an imaginary part; converting the real part and the imaginary part of the second function to polar coordinates to generate a magnitude and a phase; correcting the polar coordinates from the second function in the frequency domain to generate a third function by: applying a multiplicative inverse magnitude correction to the magnitude in the polar coordinate, and applying an additive inverse phase correction to the phase in the polar coordinate; converting the third function to rectangular coordinates to generate a fourth function in the frequency domain; and transforming the fourth function from the frequency domain to a fifth function in the time domain.

The fifth function may be a real-valued function representing an absolute oscillatory motion of the image collecting device as a function of time.

The method may further include applying the real-valued function to the first-imaged array and the second-imaged array to generated a compensated reconstructed image.

The multi-linear image data may include raw image data provided from the first-imaged array and the second-imaged array.

The first-imaged array may be a leading array of the image collecting device, and the second-imaged array may be a trailing array of the image collecting device.

The first function may be a delta function, and the measuring of the relative oscillatory motion may include correlating pixels of the image data between the leading array and the trailing array.

The transforming of the first function to the second function may include applying a fast fourier transform (FFT).

The transforming of the fourth function to the fifth function may include applying an inverse FFT.

The processing of the multi-linear image data may compensate for absolute oscillatory motion by the image collecting device.

The absolute oscillatory motion may be a high-frequency absolute oscillatory motion.

According to another aspect of the embodiments, a system for processing multi-linear image data is described. The system may include: a multi-linear optical array configured to capture an image on an image collecting platform; and an image processor configured to correct for absolute oscillatory motion exhibited by the image collecting platform, the image processor configured to execute instructions including the steps of measuring a relative oscillatory motion from a first-imaged array of the multi-linear optical array to a second-imaged array of the multi-linear optical array as a first function in time domain via image correlation; transforming the first function from the time domain to a second function in frequency domain, the second function having a real part and an imaginary part; converting the real part and the imaginary part of the second function to polar coordinates to generate a magnitude and a phase; correcting the polar coordinates from the second function in the frequency domain to generate a third function by: applying a multiplicative inverse magnitude correction to the magnitude in the polar coordinate, and applying an additive inverse phase correction to the phase in the polar coordinate; converting the third function to rectangular coordinates to generate a fourth function in the frequency domain; and transforming the fourth function from the frequency domain to a fifth function in the time domain.

BRIEF DESCRIPTION OF THE DRAWINGS

A more complete appreciation of the present invention, and many of the features and aspects thereof, will become more readily apparent as the invention becomes better understood by reference to the following detailed description when considered in conjunction with the accompanying drawings.

DETAILED DESCRIPTION

The present invention will now be described more fully with reference to the accompanying drawings, in which example embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

Figure 1:
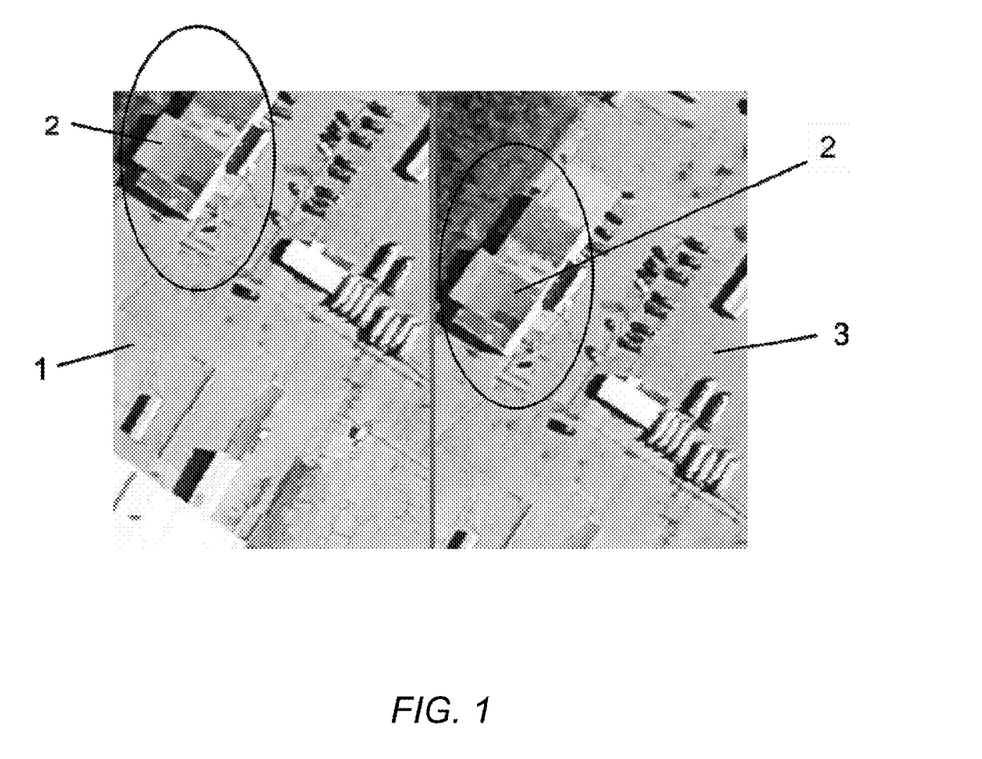
FIG. 1 shows example images captured by a leading array and a trailing array of a multi-linear optical array on a platform.

Line scanning systems collect imagery by scanning a scene using a set of linear arrays ("chips") of imaging detectors that are offset in an in-scan (i.e., flight) direction and overlapping in a cross-scan direction. The linear arrays that are thus offset are collectively known as bilinear, trilinear, or more generally, multi-linear, optical arrays. Such scanning systems may be built using multi-linear arrays because manufacturing of a long single linear array may be both impractical and cost prohibitive. Another advantage of multiple linear arrays is to allow acquisition of imagery from the same scene simultaneously for multiple look angles or for multiple color bands. Overlap is provided in the cross-scan direction to avoid missing imaging pixels as the sensor scans a scene. Since the arrays are separated in the in-scan direction, one of the arrays (e.g., leading array) of a multi-linear array system images the scene prior to another array (e.g., trailing array). An illustration of an example overlap region by two arrays is shown in FIG. 1. The image 1 shown on the left side of the page was captured with a leading array and the image 3 on the right side of the page was captured with a trailing array. Thus, it is visible here that the circled portion 2 of the image 1 on the left side is an overlap of the circled portion 2 of the image 3 on the right side. In other words, a portion of the image captured by the first array is also captured by the second array, circled and shown as 2 in FIG. 1. While the embodiment of the present invention is described with reference to a bilinear optical array having just two arrays, the imaging device can also be an optical array having any number of arrays such as, for example, two leading arrays and one trailing array, or in another example, multiple linear arrays collecting imagery simultaneously from slightly different look-angles or with different color filters. Herein the present disclosure, the term "in-scan direction" refers to the flight direction, or the direction in which the imaging device is moving, and the term "cross-scan direction" refers to the direction that crosses the in-scan direction, which is nominally perpendicular to the in-scan direction.

Oscillatory motion is caused by minute vibrations of equipment on the platform (e.g., satellite) or turbulence in the atmosphere (e.g., in the case of an aircraft) and the frequency range of these vibrations is too high to be captured in image support data. Here, the image support data may include various information that can be provided from, e.g., on-board GPS receivers, intertial navigation units, gyros, accelerometers, or other sensors of the platform, which, in turn, provides information such as an angle of rotation of the platform (e.g., roll, pitch and yaw), velocity and location of the platform, etc. That is, the image support data is provided to the imaging device and/or the processor of the imaging device at some frequency so that the processor can account for the angle, rotation, velocity or position of the platform. However, because the frequency at which the oscillatory motion vibrates may be much higher than the frequency at which the image support data is provided, the oscillatory motion is not compensated by the image support data during the image processing (e.g., image reconstruction). "High frequency" of the vibrations refers to a frequency that is higher than the frequency at which the image support data is provided.

Figure 2:
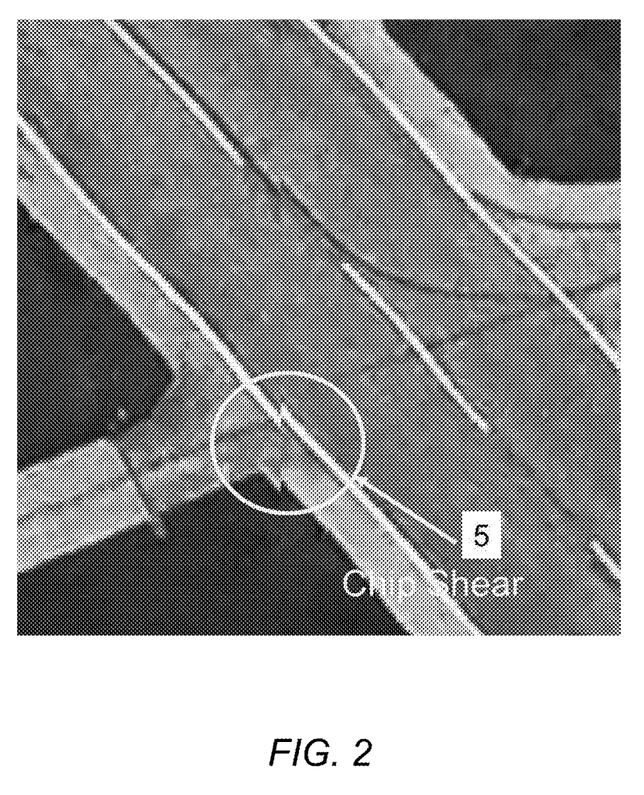
FIG. 2 shows an image with a chip shear from reconstruction of the images captured by a multi-linear optical array.

FIG. 2 shows an exemplary image that is reconstructed from the image data of a bilinear array imager. The image captured by the leading array is combined with the image captured by the trailing array to form a single reconstructed image. As a consequence of the oscillatory motion, a shear 5 (e.g., chip shear) is observed in the reconstructed image at the boundaries of the bilinear arrays because of the oscillatory motion.

Figure 3:
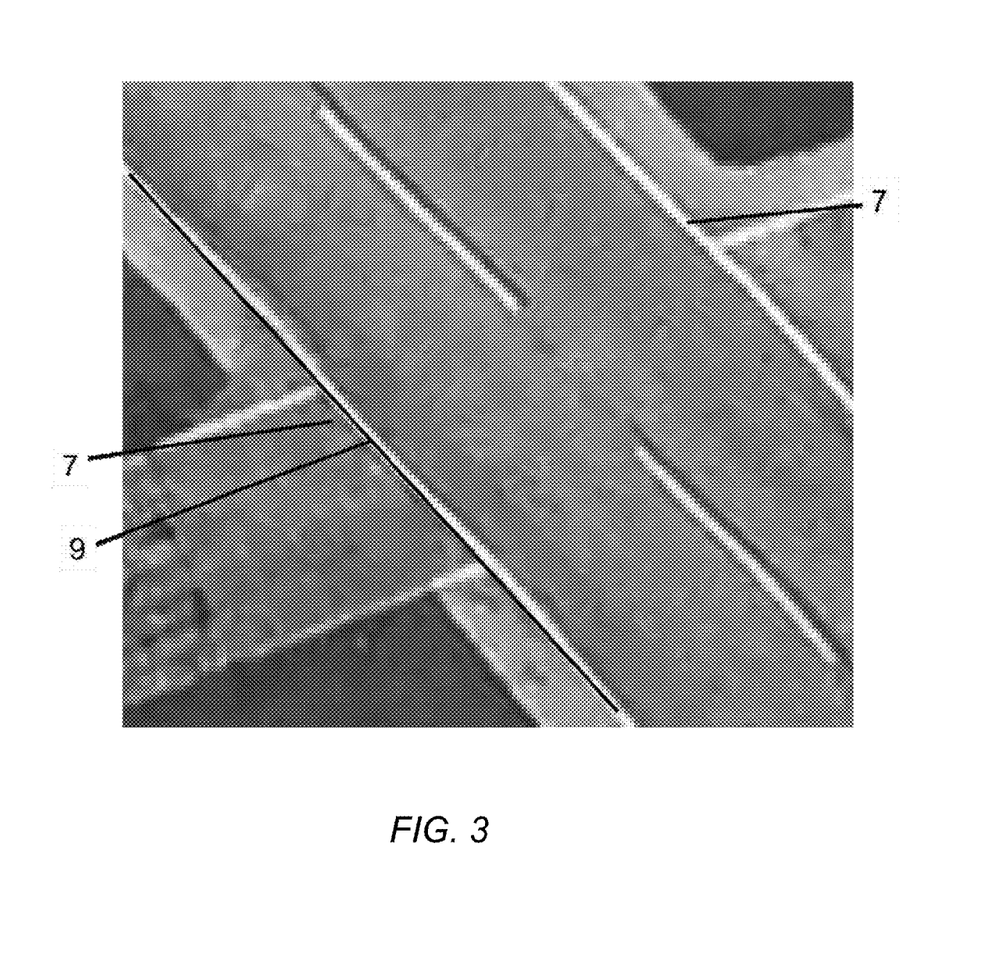
FIG. 3 shows a reconstructed image having some residual oscillatory motion where some lines appear wavy.

One approach for compensating for the chip shear due to the oscillatory motion is to correlate the portion of the imagery within the overlap regions (e.g., between the leading and trailing arrays), thereby aligning them during image reconstruction. For example, deviations between the nominal in-scan separations of the bilinear arrays are thus measured and the oscillatory motion is characterized. The measured delta (or difference) between the leading and trailing arrays is halved and applied equally as a correction to each of the leading and trailing arrays during image resampling for product generation (e.g., image reconstruction). However, because there is a significant separation in time between the two arrays (relative to the frequency of the image support data), the measurement of the oscillatory motion does not necessarily represent an instantaneous rate, but rather, an average rate over the time delta between the leading and trailing arrays. As a result, while the correction may remove some visible chip shear, some residual oscillatory motion is still present. Consequently, the residual oscillatory motion appears in the image as shown, for example, in FIG. 3, where the straight lines (e.g., the lines of the runway) exhibit significant waviness 7. A straight line 9 is drawn over the wavy line in the image of FIG. 3 as a reference for comparison.

According to an embodiment of the present invention, a measured delta of the relative oscillatory motion between the leading and trailing arrays, obtained by an image correlation process, is represented as $f(t)$ by utilizing the following equation:

$$f(t)=g(t)-g(t+\tau)=\text{leading}-\text{trailing},\qquad(1)$$

where $\tau$ represents the time separation between the leading and trailing arrays. g(t) represents a true (but unknown) oscillatory motion at the leading array as a function of time t. g(t+τ) represents the true (but unknown) oscillatory motion at the trailing array as a function of time. Thus, the delta between g(t) and g(t+τ) represents a relative oscillatory motion (e.g., relative with reference to a leading and trailing array aboard the platform). A Frequency Domain Image Motion Sensing (FDIMS) method described herein, according to an embodiment of the present invention is applied to the relative oscillatory motion function $f(t)$ by mathematically analyzing the function by a computer processor module that ultimately reconstructs the image data received from the bilinear optical arrays. By applying the FDIMS method, the original oscillatory motion function g(t) can be determined directly from the correlator measurement function $f(t)$.

The oscillatory motion may be present in both the in-scan direction and the cross-scan direction, and the image correction process can accommodate both oscillatory motions by measuring and compensating for them independently. The processor that performs the FDIMS may be a computer processor comprising a memory, located either onboard the imaging platform or remotely located, for example, at a ground station. A computer processor that is onboard the imaging platform may be configured to process the image data in real-time, as the image data is collected, or a remotely located processor may be configured to process the image data in a post-processing environment. Because g(t) characterizes the absolute oscillatory motion, the same value (with the same sign, i.e., +g(t)) may be applied equally to both the leading and trailing arrays during image reconstruction. Further since the FDIMS method determines the absolute oscillatory motion, the value need not be averaged (i.e., divided by two), as in other methods known in the art, to split the delta between leading and trailing array.

The specific method for performing FDIMS according to an embodiment of the present invention will now be described in more detail. By assuming that the oscillatory motion is periodic and comprises a single frequency, the relative oscillatory motion g(t) can be characterized as:

$$g(t) = A \sin(2\pi\omega t + \phi) \quad (2)$$

In this form, we characterize the oscillatory motion as a function of time t, amplitude A, a frequency $\omega$, and phase $\phi$. Accordingly, $f(t)$ can be represented as:

$$f(t) = A \sin(2\pi\omega t + \phi) - A \sin(2\pi\omega[t+\tau] + \phi) \quad (3)$$

By substituting:

$$a = 2\pi\omega t + \phi$$

$$b = 2\pi\omega(t+\tau) + \phi$$

Then, $$a + b = 2\pi\omega t + \phi + 2\pi\omega[t+\tau] + \phi = 4\pi\omega t + 2\pi\omega\tau + 2\phi,$$

and $$a - b = -2\pi\omega\tau.$$

The trigonometric identity, $$\sin a - \sin b = 2\cos\left(\frac{a+b}{2}\right)\sin\left(\frac{a-b}{2}\right)$$

is applied to get $$f(t) = A[\sin a - \sin b] \quad (4)$$

$$= A 2 \cos\left(\frac{a+b}{2}\right)\sin\left(\frac{a-b}{2}\right)$$

$$= 2A\cos\left(\frac{4\pi\omega t + 2\pi\omega\tau + 2\varphi}{2}\right)\sin\left(\frac{-2\pi\omega\tau}{2}\right)$$

$$= 2A\cos(2\pi\omega t + \pi\omega\tau + \varphi)\sin(-\pi\omega\tau)$$

The terms are rearranged and the trigonometric identity, $$\sin\left(\frac{\pi}{2} - u\right) = \cos u$$

is applied for the cosine term to get, $$f(t) = 2A\sin(-\pi\omega\tau)\sin\left(\frac{\pi}{2} - 2\pi\omega t - \pi\omega\tau - \varphi\right)$$

The trigonometric identity, $$\sin(-u) = -\sin(u)$$

is applied to get $$f(t) = -2A\sin(\pi\omega\tau)\left[-\sin\left(2\pi\omega t + \pi\omega\tau + \varphi - \frac{\pi}{2}\right)\right] \quad (5)$$

$$= 2A\sin(\pi\omega\tau)\sin\left(2\pi\omega t + \varphi + \pi\omega\tau - \frac{\pi}{2}\right)$$

This equation is now rewritten in the form of the original oscillatory motion function g as previously shown in equation (2) to get, $$f(t) = 2\sin(\pi\omega\tau)A\sin\left(2\pi\omega t + \varphi + \pi\omega\tau - \frac{\pi}{2}\right) \quad (6)$$

$$= \beta(\omega)g(t; \phi(\omega))$$

where the functions $\beta(\omega) = 2\sin(\pi\omega\tau)$ is a scale factor and $\phi(\omega) = \pi\omega\tau - \frac{\pi}{2}$ is a phase shift from the original oscillatory motion function g as a function of frequency $\omega$. The notation $g(t; \phi(\omega))$ indicates the original function g, but with an additional phase shift (e.g., a time delay) of $\phi(\omega)$.

Therefore, as the function $f$ is transformed from the time domain to the frequency domain, for example, via a Fast Fourier Transform (FFT), then the inverses of the scale factor function $\beta(\omega)$ and phase shift function $\phi(\omega)$ can be applied to recover the original oscillatory motion function G in the frequency domain for all frequencies, amplitudes and phases of the form shown in equation (2), up to the Nyquist of the sampling rate, which in this case is the imaging line rate. An inverse FFT (IFFT) can be performed to transform the compensated frequency domain function G to arrive at the original oscillatory motion function g.

Figure 4:
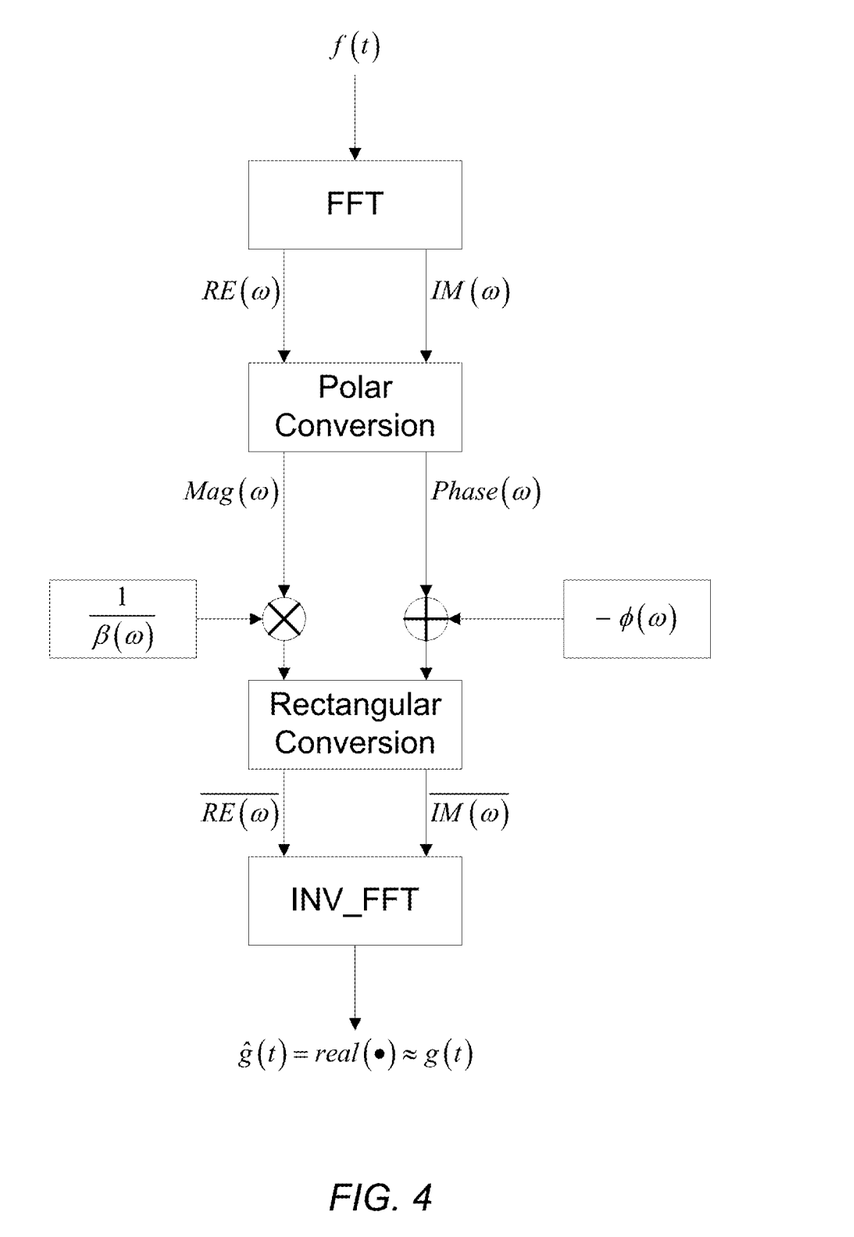
FIG. 4 is a flow diagram describing a method of processing the image data according to an embodiment of the present invention.

FIG. 4 is a flow diagram that describes each of the steps to recover the absolute oscillatory motion. According to an embodiment of the present invention, the relative oscillatory motion function $f(t)$ is measured by correlating the images from leading and trailing arrays. The function $f(t)$ is transformed from a function in the time domain to a function in the frequency domain (S1) by applying, for example, FFT. The transformed function in the frequency domain has a real part RE(ω) and an imaginary part IM(ω). The real and imaginary parts of the transformed function are converted to polar coordinates (S2), which results in a magnitude function Mag(ω) and a phase function Phase(ω) in the frequency domain of the transformed function. A multiplicative inverse of the magnitude correction function β(ω) (S3) can be applied to the magnitude function and an additive inverse of the phase correction function ϕ(ω) (S4) can be applied to the phase function to compensate for the relative oscillatory motion in the frequency domain. The compensated magnitude and phase functions can be converted back to rectangular coordinates (S5) having real and imaginary parts. The real and imaginary parts can be transformed from the frequency domain to the time domain (S6) by applying, for example, IFFT, thus resulting in a correction to the original delta function in the time domain $f(t)$ to arrive at the recovered absolute oscillatory motion time function $\hat{g}(t)$. The recovered absolute oscillatory motion time function $\hat{g}(t)$ is a real-valued function representing the absolute oscillatory motion of the platform (e.g., the aircraft or satellite system) as a function of time. Therefore, the recovered absolute oscillatory motion $\hat{g}(t)$ can be applied to both the leading array and the trailing array during image reconstruction to obtain an oscillatory motion compensated image. In some embodiments, the resulting function $\hat{g}$ from the FDIMS method according to steps S1-S6 may be applied for each scan line via the sensor's line-to-time formula.

In an exemplary application of the FDIMS method, steps S1-S6 were simulated using a series of decaying sine waves. For the simulation, the oscillatory motion function was represented as:

$$g(t) = \sum_{i=1}^{N} A_i \sin(2\pi\omega_i t + \varphi_i) \times e^{-k_i t}$$

A simulation decay factor $k_i$ was added to each sine wave i, since this has been observed in real data in some platforms within the measured correlation results for function $f$. A simulation of the correlation process (e.g., the function $f(t)$) is then employed via evaluation using the equation $$f(t)=g(t)-g(t+\tau)=\text{leading}-\text{trailing}.$$

Figure 5:
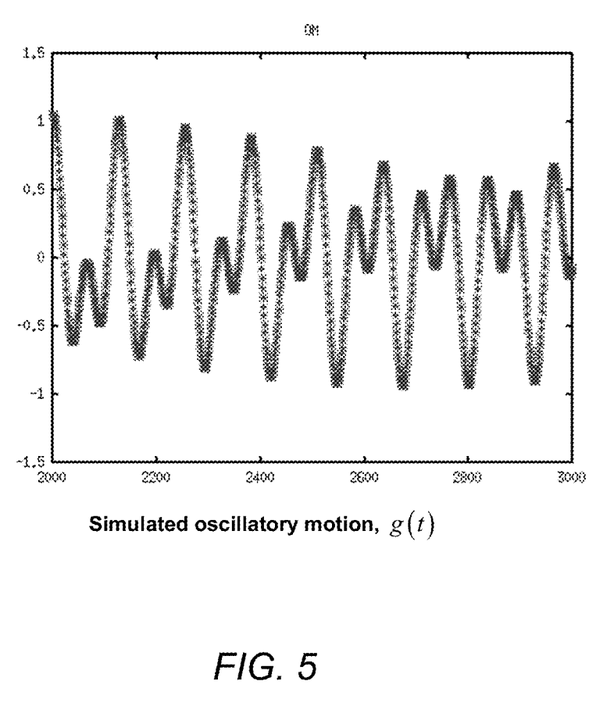
FIG. 5 shows a graphical plot of oscillatory motion represented by function g(t).
Figure 6:
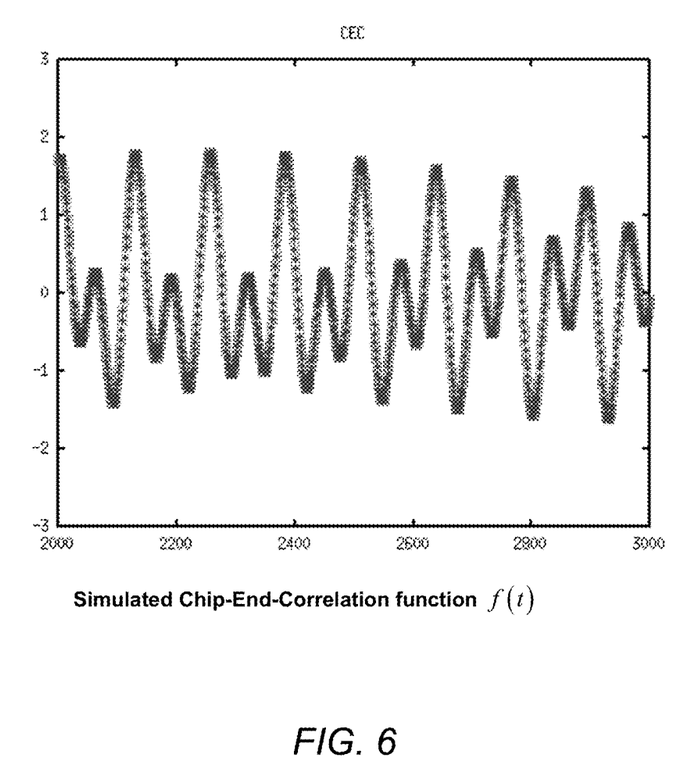
FIG. 6 shows a graphical plot of a correlation function $f(t)$.
Figure 7:
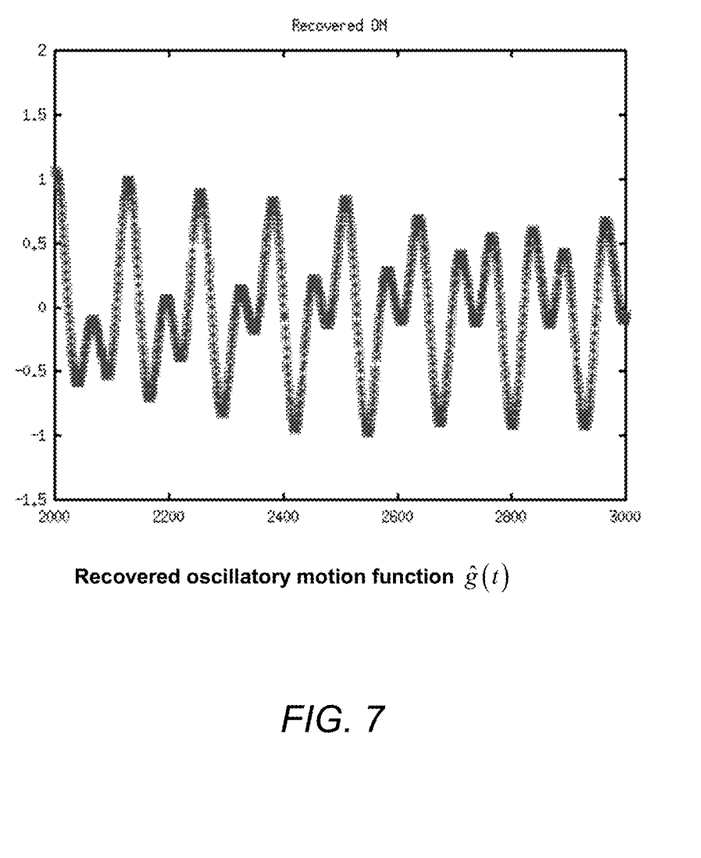
FIG. 7 shows a graphical plot of a recovered oscillatory motion function $\hat{g}(t)$.
Figure 8:
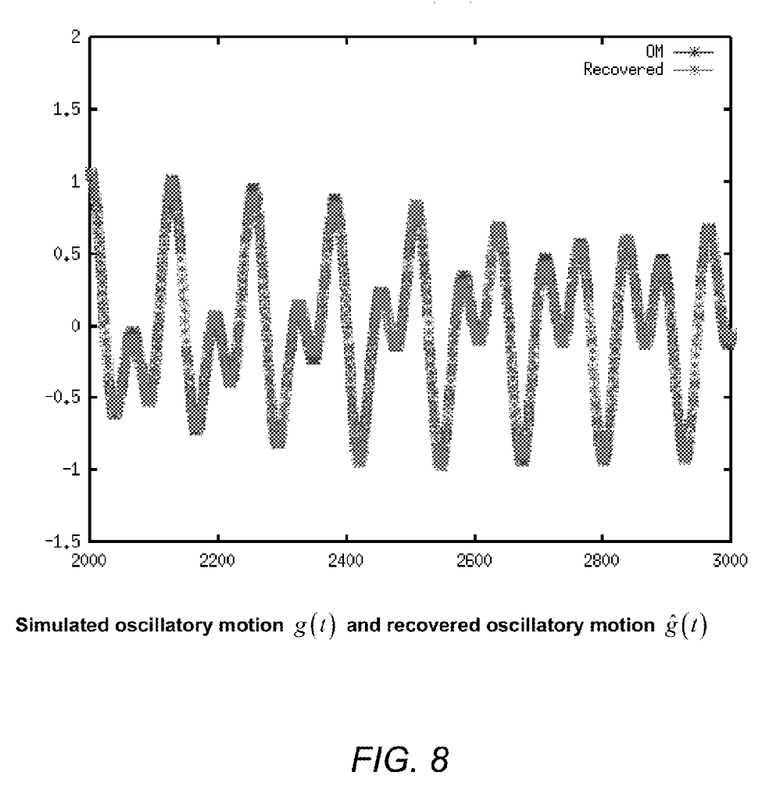
FIG. 8 shows a graphical comparison of g(t) from FIG. 5 with $\hat{g}(t)$ from FIG. 7.

For example, FIG. 5 shows a portion of a simulated oscillatory motion function g(t). The x-axis represents line number (which is converted to time via line-to-time formula), and the y-axis represents the simulated oscillatory motion in units of pixels. FIG. 6 shows a corresponding plot for simulated function $f(t)$ (delta between the leading and trailing arrays) of the chip-end correlation process. FIG. 7 shows the recovered absolute oscillatory motion function $\hat{g}(t)$ as a result of application of the FDIMS method according to steps S1-S6. FIG. 8 shows a comparison of the original simulated oscillatory motion function g(t) compared with the recovered absolute oscillatory motion function $\hat{g}(t)$ on the same plot. Because this example is a simulation, the original oscillatory motion function g(t) is a known function, and therefore, the recovered absolute oscillatory motion function $\hat{g}(t)$ can be compared against the known original oscillatory motion function g(t). As can be seen in FIG. 8, the oscillatory motion function $\hat{g}(t)$ recovered according to the FDIMS simulation method is very close to the original function g(t).

Figure 9:
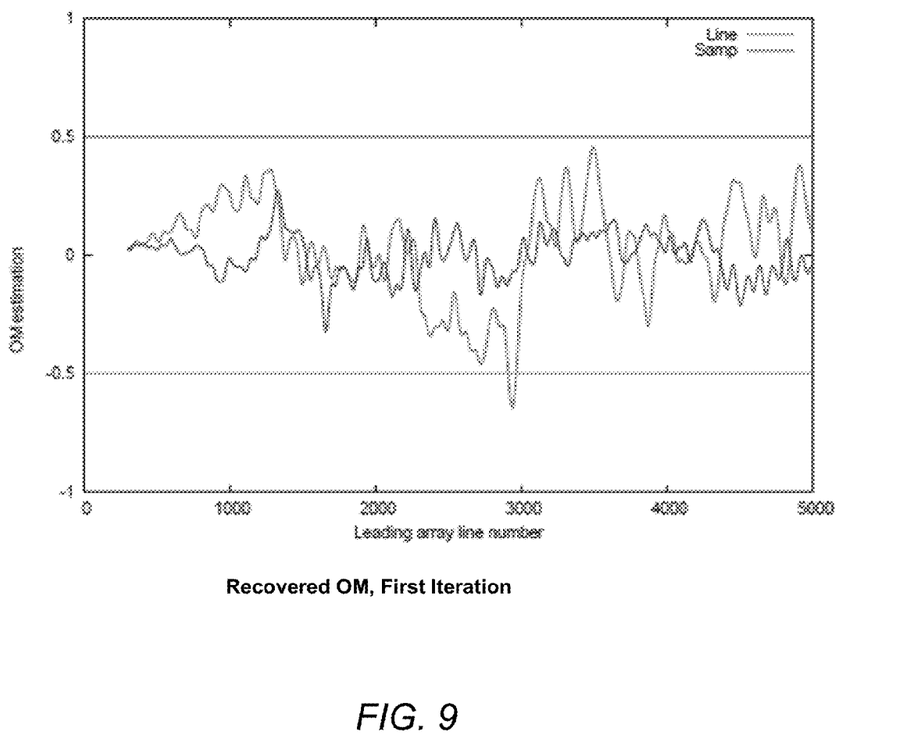
FIG. 9 shows a graphical plot of the recovered oscillatory motion after a first iteration.
Figure 10:
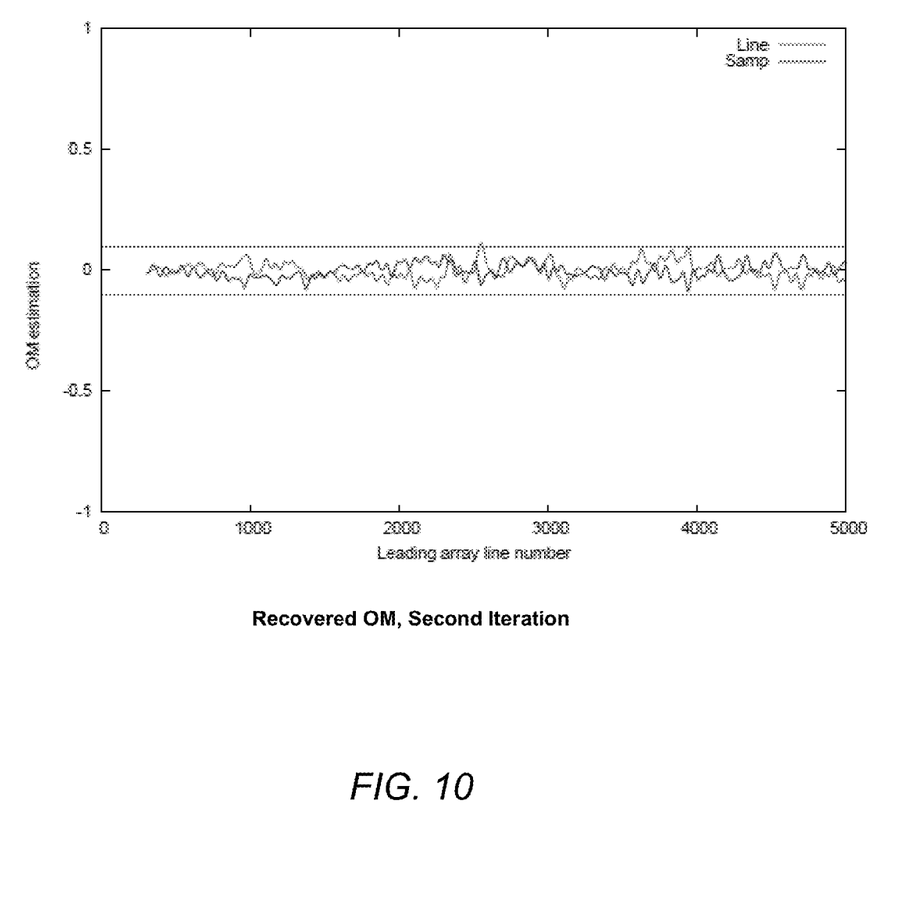
FIG. 10 shows a graphical plot of the recovered oscillatory motion after a second iteration.

In another exemplary application, the FDIMS method was applied to actual raw image data from bilinear optical arrays on a satellite. An example multiple linear array system is described in the reference, Updike, Todd and Comp, Chris, "*Radiometric Use of World View-2 Imagery*", Digital Globe Technical Note, Nov. 1, 2010, all of which is incorporated herein by reference in its entirety. The method according to steps S1-S6 of FIG. 4 was performed twice—a first iteration and a second iteration. That is, during the first iteration, the FDIMS method was applied to real chip-end correlation results that were obtained from the real raw image data. The recovered oscillatory motion function after the first iteration is shown in the graph of FIG. 9 where the function oscillates between approximately +/−0.4 pixels along the y-axis. The FDIMS method as applied again, for a second iteration to the data obtained as a result of the first iteration. That is, the FDIMS method was applied to the function where the oscillatory motion was already compensated from the first iteration. As expected, the recovered oscillatory motion function from the second iteration of the FDIMS method was reduced by a factor of about four. FIG. 10 shows that that the recovered oscillatory motion from the second iteration is approximately +/−0.1 pixels along the y-axis.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims and their equivalents.

The invention claimed is:

1. A method for processing multi-linear image data provided from a multi-linear optical array on an image collecting platform to correct for absolute oscillatory motion exhibited by the image collecting platform, the method comprising:
    measuring a relative oscillatory motion from a first-imaged array of the multi-linear optical array to a second-imaged array of the multi-linear optical array as a first function in time domain via image correlation;
    transforming the first function from the time domain to a second function in frequency domain, the second function having a real part and an imaginary part;
    converting the real part and the imaginary part of the second function to polar coordinates to generate a magnitude and a phase;
    correcting the polar coordinates from the second function in the frequency domain to generate a third function by:
        applying a multiplicative inverse magnitude correction to the magnitude in the polar coordinate, and
        applying an additive inverse phase correction to the phase in the polar coordinate;
    converting the third function to rectangular coordinates to generate a fourth function in the frequency domain; and
    transforming the fourth function from the frequency domain to a fifth function in the time domain,
    wherein the multiplicative inverse magnitude correction applied to a magnitude in a polar coordinate of the second function, at an angular frequency ω, equals $1/(2\sin(\pi\omega\tau))$, wherein τ is a time separation between the first-imaged array and the second-imaged array.

2. The method of claim 1, wherein the fifth function is a real-valued function representing an absolute oscillatory motion of the image collecting device as a function of time.

3. The method of claim 2, further comprising applying the real-valued function to the first-imaged array and the second-imaged array to generated a compensated reconstructed image.

4. The method of claim 1, wherein the multi-linear image data comprises raw image data provided from the first-imaged array and the second-imaged array.

5. The method of claim 4, wherein the first-imaged array is a leading array of the image collecting device, and the second-imaged array is a trailing array of the image collecting device.

6. The method of claim 5,
wherein the first function is a delta function, and
wherein the measuring the relative oscillatory motion comprises correlating pixels of the image data between the leading array and the trailing array.

7. The method of claim 1, wherein the transforming the first function to the second function comprises applying a fast fourier transform (FFT).

8. The method of claim 1, wherein the transforming the fourth function to the fifth function comprises applying an inverse FFT.

9. The method of claim 1, wherein the processing of the multi-linear image data compensates for absolute oscillatory motion by the image collecting device.

10. The method of claim 9, wherein the absolute oscillatory motion is a high-frequency absolute oscillatory motion.

11. A system for processing multi-linear image data, the system comprising:
a multi-linear optical array configured to capture an image on an image collecting platform; and
an image processor configured to correct for absolute oscillatory motion exhibited by the image collecting platform, the image processor configured to execute instructions comprising the steps of:
measuring a relative oscillatory motion from a first-imaged array of the multi-linear optical array to a second-imaged array of the multi-linear optical array as a first function in time domain via image correlation;
transforming the first function from the time domain to a second function in frequency domain, the second function having a real part and an imaginary part;
converting the real part and the imaginary part of the second function to polar coordinates to generate a magnitude and a phase;
correcting the polar coordinates from the second function in the frequency domain to generate a third function by:
applying a multiplicative inverse magnitude correction to the magnitude in the polar coordinate, and
applying an additive inverse phase correction to the phase in the polar coordinate;
converting the third function to rectangular coordinates to generate a fourth function in the frequency domain; and
transforming the fourth function from the frequency domain to a fifth function in the time domain,
wherein the multiplicative inverse magnitude correction applied to a magnitude in a polar coordinate of the second function, at an angular frequency $\omega$, equals $1/(2 \sin(\pi \omega \tau))$, wherein $\tau$ is a time separation between the first-imaged array and the second-imaged array.

12. The system of claim 11, wherein the fifth function is a real-valued function representing an absolute oscillatory motion of the image collecting device as a function of time.

13. The system of claim 12, wherein the instructions further comprise applying the real-valued function to the first-imaged array and the second-imaged array to generated a compensated reconstructed image.

14. The system of claim 11, wherein the multi-linear image data comprises raw image data provided from the first-imaged array and the second-imaged array.

15. The system of claim 14, wherein the first-imaged array is a leading array of the image collecting device, and the second-imaged array is a trailing array of the image collecting device.

16. The system of claim 15,
wherein the first function is a delta function, and
wherein the measuring of the relative oscillatory motion comprises correlating pixels of the image data between the leading array and the trailing array.

17. The system of claim 11, wherein the transforming the first function to the second function comprises applying a fast fourier transform (FFT).

18. The system of claim 11, wherein the transforming the fourth function to the fifth function comprises applying an inverse FFT.

19. The system of claim 11, wherein the processing of the multi-linear image data compensates for absolute oscillatory motion by the image collecting device.

20. The system of claim 19, wherein the absolute oscillatory motion is a high-frequency absolute oscillatory motion.

* * * * *